US012214976B2

(12) United States Patent
Trabattoni et al.

(10) Patent No.: US 12,214,976 B2
(45) Date of Patent: Feb. 4, 2025

(54) DEVICE AND METHOD FOR TRANSFERRING ELASTOMER BLOCKS

(71) Applicant: Compagnie Generale Des Etablissements Michelin, Clermont-Ferrand (FR)

(72) Inventors: Thomas Trabattoni, Clermont-Ferrand (FR); Frédéric Drago, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 18/036,279

(22) PCT Filed: Nov. 8, 2021

(86) PCT No.: PCT/FR2021/051969
§ 371 (c)(1),
(2) Date: May 10, 2023

(87) PCT Pub. No.: WO2022/101571
PCT Pub. Date: May 19, 2022

(65) Prior Publication Data
US 2023/0406651 A1    Dec. 21, 2023

(30) Foreign Application Priority Data
Nov. 16, 2020   (FR) ...................... 2011708

(51) Int. Cl.
*B65G 61/00*   (2006.01)
*B25J 15/00*   (2006.01)

(52) U.S. Cl.
CPC ............... *B65G 61/00* (2013.01); *B25J 15/00* (2013.01)

(58) Field of Classification Search
CPC ........ B25J 15/00; B65G 59/005; B65H 9/103; B65H 9/106; B65H 9/105; B65H 9/108
See application file for complete search history.

(56) References Cited

U.S. PATENT DOCUMENTS

| 3,588,092 | A | * | 6/1971 | Dubas | ...................... B65H 3/22 271/14 |
| 5,137,268 | A | * | 8/1992 | Suya | ........................ B65H 3/48 271/106 |
| 5,234,207 | A | * | 8/1993 | Lindstrom | ........... B65H 3/0816 271/106 |
| 5,256,028 | A | * | 10/1993 | Winski | ................. B65G 59/005 108/52.1 |

(Continued)

FOREIGN PATENT DOCUMENTS

| CN | 104590901 A | 5/2015 |
| CN | 107406206 A | 11/2017 |

(Continued)

*Primary Examiner* — Gregory W Adams
(74) *Attorney, Agent, or Firm* — Dickinson Wright PLLC; Steven C. Hurles

(57) ABSTRACT

The disclosure relates to a device for the automated transfer of an elastomeric block between a first position, where it is installed on a flexible support, and a second position. The device comprises a gripper that is able to take hold of the block and a manipulator that is able to move and orient the gripper so as to set the block in motion.
The disclosure also relates to a method for running such a device.

14 Claims, 2 Drawing Sheets

(56) References Cited

U.S. PATENT DOCUMENTS

| | | | |
|---|---|---|---|
| 5,295,673 A * | 3/1994 | Torisawa | B65H 7/12 |
| | | | 271/106 |
| 5,657,618 A | 8/1997 | Dall'omo et al. | |
| 6,106,220 A * | 8/2000 | Ouellette | B65G 57/005 |
| | | | 414/796.8 |
| 6,332,750 B1 | 12/2001 | Donner et al. | |
| 9,978,624 B2 * | 5/2018 | Oremus | H01L 21/67092 |
| 2004/0028519 A1 | 2/2004 | Spatafora et al. | |
| 2013/0013109 A1 | 1/2013 | Brudniok et al. | |
| 2014/0169925 A1 * | 6/2014 | Bando | B65H 3/0816 |
| | | | 414/797 |
| 2018/0050874 A1 | 2/2018 | Albert | |
| 2019/0260040 A1 | 8/2019 | Yano | |

FOREIGN PATENT DOCUMENTS

| | | | | |
|---|---|---|---|---|
| CN | 206645553 U | 11/2017 | | |
| DE | 2223782 A1 | 11/1973 | | |
| EP | 1361184 A1 | 11/2003 | | |
| FR | 3075682 A1 * | 6/2019 | | B25J 15/0071 |
| JP | S57160827 A | 10/1982 | | |
| JP | 2003182846 A | 7/2003 | | |
| JP | 2005297091 A | 10/2005 | | |

* cited by examiner

DEVICE AND METHOD FOR TRANSFERRING ELASTOMER BLOCKS

CROSS-REFERENCE TO RELATED APPLICATION

This application claims priority to and the benefit of PCT Patent Application No. PCT/FR2021/051969 filed on 8 Nov. 2021, entitled "DEVICE AND METHOD FOR TRANSFERRING ELASTOMER BLOCKS", and French Patent Application No. FR2011708, filed on 16 Nov. 2020, entitled "DEVICE AND METHOD FOR TRANSFERRING ELASTOMER BLOCKS".

BACKGROUND

1. Field

The present disclosure relates to a device for the automated transfer of elastomeric blocks, and to a method for transferring elastomeric blocks using such a device.

The movement of an elastomeric block is carried out in a wide variety of industrial applications in which it is necessary to transfer the block from a first position to a second, following a manufacturing process.

2. Related Art

The prior art discloses various means for avoiding manual transfer of blocks, which may prove to be relatively heavy, for example of the order of several tens of kilograms. Thus, the application JP2005297091 describes an automated transfer gantry comprising a gripper provided with two drill bits intended to take hold of the blocks stacked in a container.

Also known, from the application US20130013109, is an assistance device for an automated manipulator. A load is held by a gripper fixed at the end of the manipulator. The assistance device takes the form of a crane which has pulleys and a mass compensation device. A cable, guided by the pulleys, connects the compensation device to the manipulator such that the masses of the load and of the gripper are partially compensated.

Depending on the industrial configuration in which the blocks are used, it is not rare to see the use of a support, for example a conveyor belt, on which the blocks are positioned before they are transferred. However, it has been found, in the use of such devices, that the blocks tend to stick to the support. In order to remedy this, it has been envisaged to use non-stick supports, such as textiles covered with a non-stick agent. However, it has been found that the use of such an agent is not sufficient, and that the elastomeric blocks still stick residually to the support.

This residual sticking may in fact cause the non-stick support to be carried along by the elastomeric block while it is being transferred until it detaches completely and falls by itself. Since this falling is not controlled, the non-stick support, once it has fallen, can form folds or undulations that may prevent the following elastomeric block from being picked up. Moreover, in certain configurations, it is useful to be able to evacuate the support once the blocks have been transferred, and the partial folding of the support may prevent it from being gripped in order to be evacuated.

SUMMARY OF THE INVENTION

The present disclosure therefore aims to solve this problem by providing solutions that aim to limit the movement of the support while the blocks are being transferred. Thus, the present disclosure relates to a device for the automated transfer of an elastomeric block between a first position, where it is installed on a flexible support, and a second position, comprising a gripper that is able to take hold of the block and a manipulator that is able to move and orient the gripper so as to set the block in motion, the device being characterized in that it also comprises means for maintaining the position of the support during a movement of the elastomeric block and means for returning the flexible support into position, comprising a device for blowing air in the direction of the flexible support.

An elastomeric block may be in different forms, in particular in the form of a parallelepiped.

Advantageously, the flexible support is a non-stick support, for example a textile covered with a non-stick agent. Nevertheless, a device according to the disclosure makes it possible to transfer elastomeric blocks that are disposed on a different type of flexible support, since the means for maintaining the position of the support make it possible to withstand the traction force exerted by the elastomeric block on the support when the block is moved by the gripper.

In one preferred embodiment, the means for maintaining the position of the support comprise a linear actuator intended to exert a force normal to the surface of the flexible support.

In one preferred embodiment, the means for maintaining the position of the support also comprise an arm installed on the linear actuator, having a device for bearing on the flexible support.

In one preferred embodiment, in which the flexible support has a rectangular shape, the position-maintaining means are positioned above at least two corners of the flexible support.

In one advantageous embodiment, a system according to the disclosure comprises means for automating the position-maintaining means and/or the position-returning means. This makes it possible to make the system autonomous, and does not require an operator to intervene during the transfer of the set of blocks situated on one and the same support.

A further subject of the disclosure is a system for transferring blocks, having a plurality of elastomeric blocks installed on a flexible support of rectangular shape, and a transfer device according to the disclosure.

Another subject of the disclosure is a method for running a system according to the disclosure, the method comprising:
- at least one step of gripping and lifting an elastomeric block positioned on the support,
- at least one step of activating the position-maintaining means over a corner of the support,
- at least one other step of gripping and lifting an elastomeric block, which is repeated as many times as the number of blocks positioned initially on the support, minus one.

In one advantageous embodiment, a method according to the disclosure comprises another step of activating the position-maintaining means over another corner of the support.

In one advantageous embodiment, a method according to the disclosure also comprises a step of activating position-returning means. These position-returning means are for example nozzles for blowing air in the direction of the support. The flow of air makes it possible to re-flatten the support, which may have been raised during the lifting of an elastomeric block.

The nozzles are advantageously used during the gripping and removal of a block installed in a corner of the non-stick support. Preferably, in the case in which the position-returning means comprise a plurality of nozzles, it is the nozzle positioned in the direction of the lifted corner that is actuated from the moment at which the gripper takes hold of the block until the end of the gripping cycle defined by a passing point of the robot. Throughout the phase in which the nozzle is activated, the latter is involved in the "peeling" of the interlayer of the block by taking advantage of the surface of the non-stick support lifted by the block, which is thus exposed to the flow of air which generates a force involved in the detachment between the interlayer and the block.

The flow of air generated by the nozzle also makes it possible to control the dropping of the interlayer when it is completely separated from the block. On account of the continuous flow of air, the non-stick support cannot form a fold towards the interior of the pallet and therefore cannot fall onto another block. The orientable nature of the nozzles makes it possible to enhance the precision of the blowing.

BRIEF DESCRIPTION OF THE DRAWINGS

Further embodiments and advantages of the disclosure will be described, in a non-limiting manner, with the aid of the figures, in which.

DETAILED DESCRIPTION OF THE ENABLING EMBODIMENT

Figure 1:
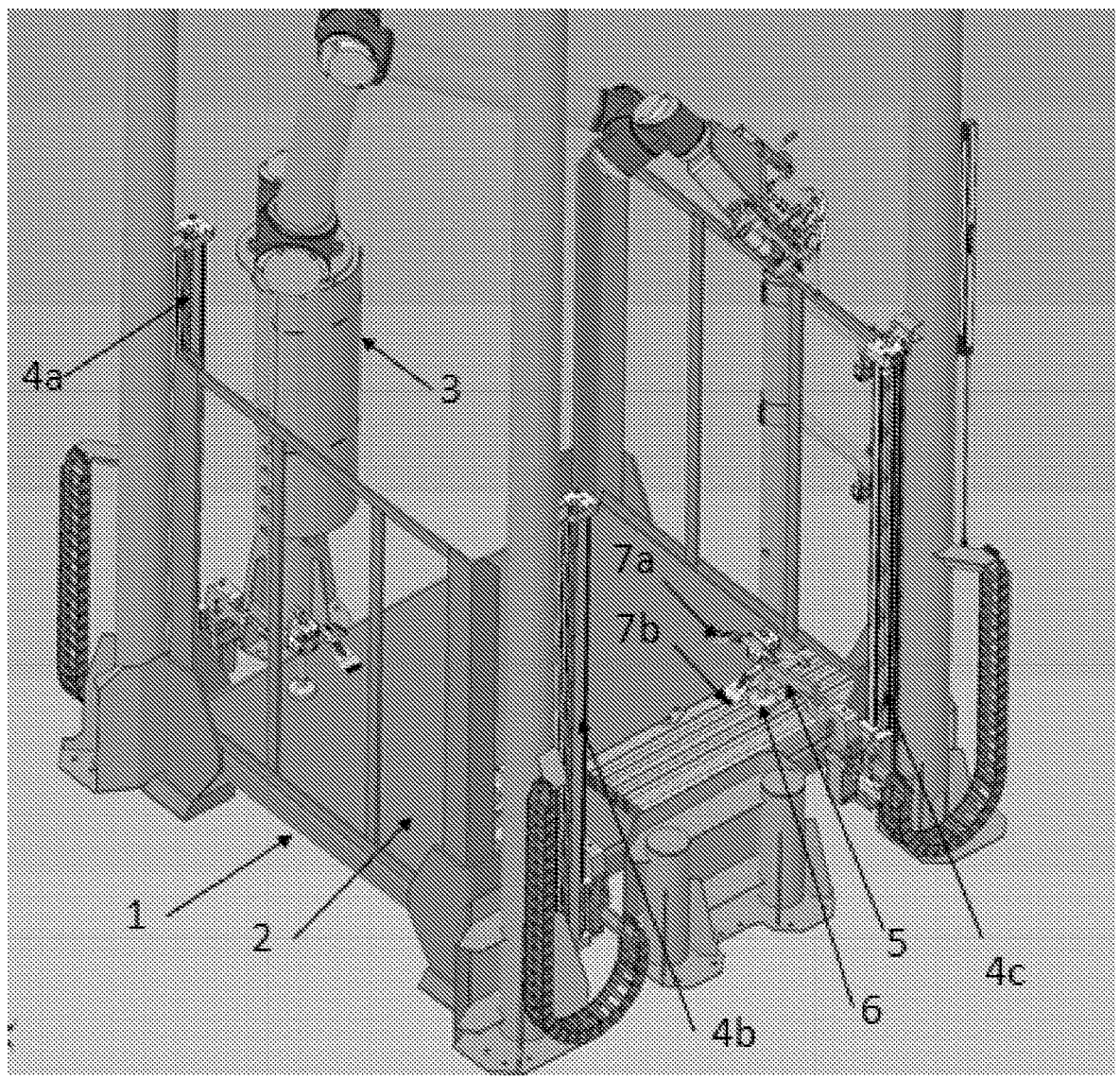
FIG. 1 shows an overall view of a device according to the disclosure.
Figure 2:
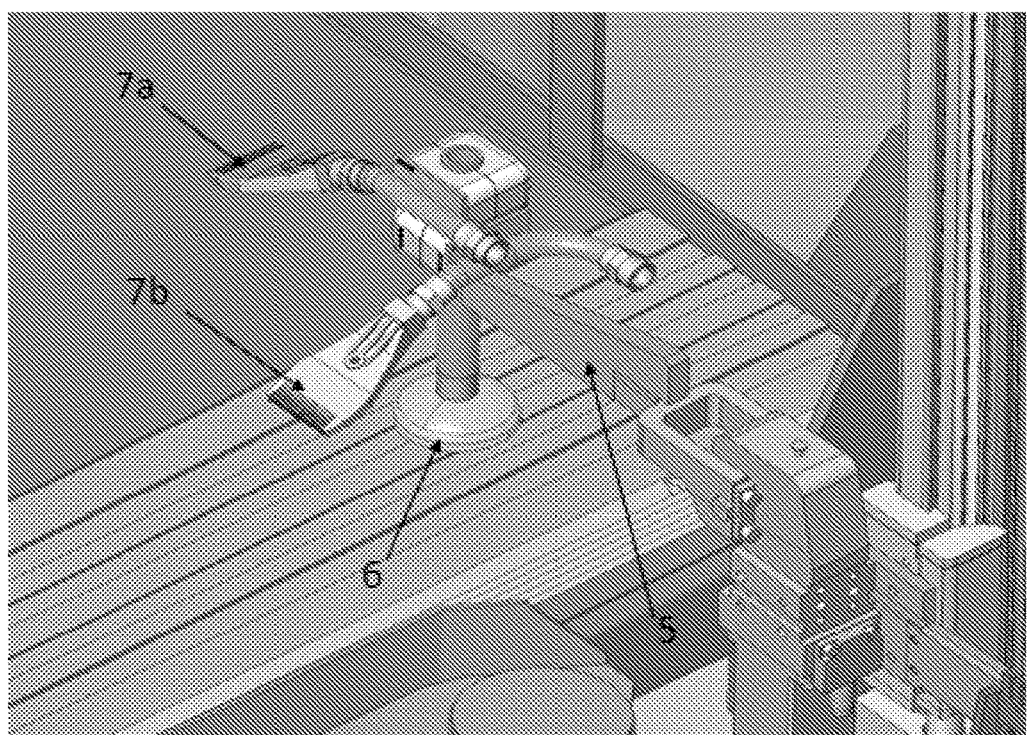
FIG. 2 shows a detailed view of an element of a device according to the disclosure.

An example of a device according to the disclosure is shown in FIG. 1. The device comprises a table 1 on which is disposed a flexible support 2, intended to receive elastomeric blocks (not shown in this figure).

The device comprises a robot 3 provided with an arm (manipulator 9), at the end of which there is a claw (gripper 8) for catching hold of the blocks to be moved.

The device also comprises three vertical actuators 4a, 4b and 4c that are disposed at the corners of the table 1. The operation of one of these actuators will be described in detail, but this description applies to all three actuators, which are identical. It is specified here that the disclosure is not restricted to this number of actuators. Specifically, a device according to the disclosure may have between one and four actuators, preferably two.

The actuator 4a is a rodless pneumatic cylinder allowing a bearing system to be raised and lowered. This system has an arm 5 that is automatically actuable, by a cylinder or a motor, at the end of which is positioned a cylindrical bearing surface 6, configured so as not to damage the flexible support during bearing. The actuable arm is, in the example, a pneumatic clamp, a device that is well known to those skilled in the art.

The arm is surmounted by two blowing nozzles 7a and 7b for controlling the falling of the support onto the table, if it is lifted during the removal of the block, specifically before a fold is formed during this falling.

These blowing nozzles are advantageously orientable, in order to be able to blow in different directions depending on the step in the cycle of moving the blocks, as described below.

Specifically, the advantages of a system according to the disclosure will be enhanced if it is used in an optimized operating cycle.

Figure 3:
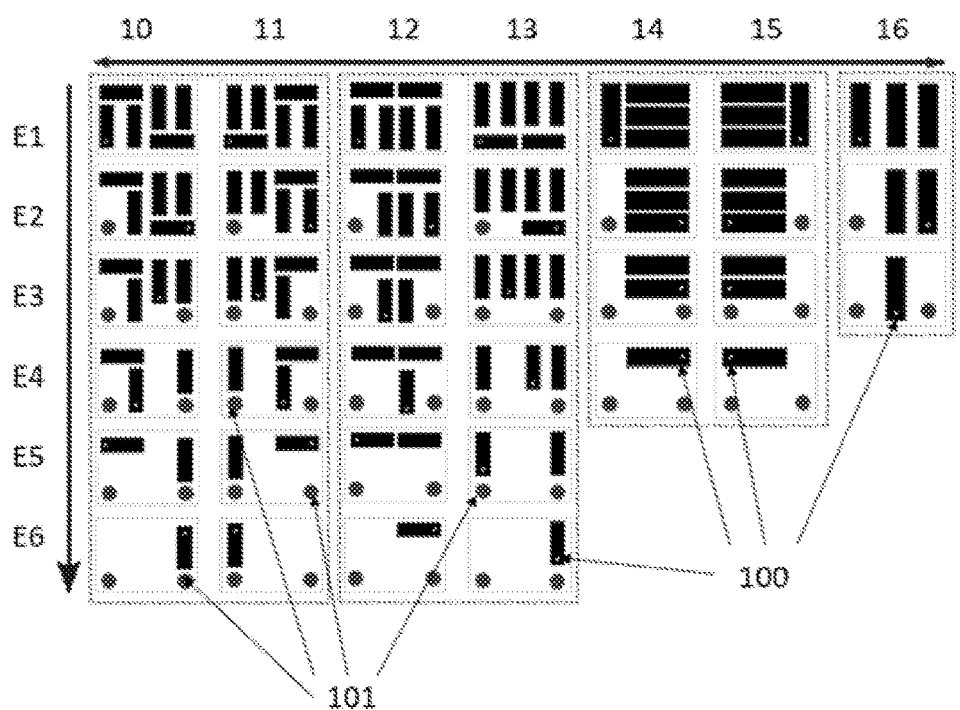
FIG. 3 shows several examples of cycles that are applicable in a method according to the disclosure.

FIG. 3 shows seven different configurations, numbered 10 to 16, for positioning elastomeric blocks, shown in top view by way of black rectangles.

Configurations 10 to 13 show combinations with six elastomeric blocks, configurations 14 and 15 have four larger blocks, and configuration 16 has three blocks, which are likewise larger.

The disclosure applies specifically to different types of blocks, regardless of their base area and their height. When larger blocks are intended to be moved, the format of the gripper should be adapted so that it has a jaw, or claw, that is fairly large. Depending on the embodiments, different types of gripper can be used, such as a claw, a jaw, a drill bit.

The top line indicates the state of each configuration at the start of a cycle.

In all the configurations, it is apparent that the blocks are distributed over the entire support, represented by the outer rectangle. Consequently, at the start of the cycle, in step E1, there is no room and it is necessary to position the position-maintaining means on the support.

Each step of the cycle, number chronologically from E1 to E6, shows a removal of a block. Thus, a block transferring method has as many steps as the number of blocks to be transferred.

Surprisingly, it has been found that it was advantageous not to lift the block at the middle but at one of the ends. Specifically, when a vertical traction force is applied to one end of the block, the other end will be pushed in the direction of the flexible support and will therefore play a role in maintaining the position of the support.

Even more advantageously, it has been found that it was necessary to take hold the block at the end furthest away from the center of the support in order that the force exerted on the support by the block is not applied to one side of the support, which is more able to fold under the effect of this force.

The gripping points of the blocks are represented in FIG. 3 by the white dots 100. The arrows present in the figure only show the presence of these gripping points in four cases, but each step in each configuration comprises such a point.

The different steps of a transfer method will now be described. The three first steps are common to all of the configurations.

Step A: the elastomeric block of which one end is located in the bottom left-hand corner of the support is removed, by taking hold of it at this end, Step B: at the position thus freed up, the vertical actuator is vertically lowered so as to bear, with the aid of the pneumatic clamp, at the location indicated by the circles 101 in the figure, and the block of which one end is located in the bottom right-hand corner is removed, by taking hold of it at this end, Step C: at the position thus freed up, the second vertical actuator is lowered, and then a third block is removed.

Subsequent steps: in the configurations shown in this example, only two actuators are used. The subsequent steps therefore consist in removing the remaining blocks one by one in an order that depends on the configurations.

It is specified that, like for the points 100, only four circles 101 are referenced in the figure, but all of the circles should be understood as being bearing points of the pneumatic clamp.

However, certain rules common to all the configurations allow optimal operation of a system according to the disclosure:

- the elastomeric blocks of which one end is located in the top (right-hand or left-hand) corners will be removed last. Thus, they can play the position-maintaining role up to the last, or penultimate, step of the cycle.
- the blocks are removed in decreasing order of distance from the center of the support, apart from the two abovementioned blocks,
- each block is taken hold of at the end situated furthest away from the support.

Thus, a system according to the disclosure makes it possible to remedy the drawbacks of the prior art by providing a solution for easily transferring the elastomeric blocks. The effectiveness of the system is further enhanced when it is run according to a predetermined cycle depending on the position of the elastomeric blocks on the support.

What is claimed is:

1. A device for the automated transfer of an elastomeric block between a first position, where it is installed on a flexible support, and a second position, comprising a gripper that is able to take hold of the block and a manipulator that is able to move and orient the gripper so as to set the block in motion, it also comprises a means for maintaining the position of the support during a movement of the elastomeric block, the means for maintaining the position of the support including a linear actuator with an arm that has a device for bearing on the flexible support, and a means for returning the flexible support into position, comprising a device for blowing air in the direction of the flexible support to blow air towards the flexible support to return the flexible support into position, the device including at least two nozzles that are oriented in different directions.

2. The device according to claim 1, wherein the flexible support has a rectangular shape, and the position-maintaining means are positioned above at least two corners of the flexible support.

3. The device according to claim 1, wherein the flexible support is a non-stick support.

4. The device according to claim 1, comprising a means for automating at least one of the position-maintaining means and the position-returning means.

5. A system for transferring blocks, having a plurality of elastomeric blocks installed on a flexible support of rectangular shape, and a transfer device according to claim 1.

6. A method for running a system according to claim 5, the method comprising:
- at least one step of gripping and lifting an elastomeric block positioned on the support,
- at least one step of activating the position-maintaining means over a corner of the support,
- at least one other step of gripping and lifting an elastomeric block, which is repeated as many times as the number of blocks positioned initially on the support, minus one.

7. The running method according to claim 6, comprising another step of activating the position-maintaining means over another corner of the support.

8. The running method according to claim 6, also comprising a step of activating position-returning means.

9. A device for the automated transfer of an elastomeric block between a first position, where the elastomeric block is installed on a flexible support, and a second position, the device comprising:
- a gripper that is able to take hold of the block;
- a manipulator that is able to move and orient the gripper so as to set the block in motion;
- the manipulator further including a linear actuator for maintaining the position of the support during a movement of the elastomeric block and at least two nozzles that are oriented in different directions and are configured to blow air towards the flexible support to return the flexible support into position.

10. The device as set forth in claim 9, wherein the linear actuator is configured to exert a force normal to the surface of the flexible support.

11. The device according to claim 10, wherein the manipulator also includes an arm installed on the linear actuator, the arm having a device for bearing on the flexible support.

12. The device according to claim 9, wherein the flexible support has a rectangular shape, and the manipulator is positioned above at least two corners of the flexible support.

13. The device according to claim 9, wherein the flexible support is a non-stick support.

14. The device according to claim 9, further comprising a means for automating at least one of the position-maintaining means and the position-returning means.

* * * * *